US012725930B2

(12) United States Patent
Kuo et al.

(10) Patent No.: US 12,725,930 B2
(45) Date of Patent: Sep. 1, 2026

(54) HYBRID ANTENNA STRUCTURE

(71) Applicant: Wistron NeWeb Corp., Hsinchu (TW)

(72) Inventors: Li-Kai Kuo, Hsinchu (TW); Jun-Yan Chen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 98 days.

(21) Appl. No.: 18/795,798

(22) Filed: Aug. 6, 2024

(65) Prior Publication Data

US 2025/0079711 A1 Mar. 6, 2025

(30) Foreign Application Priority Data

Sep. 1, 2023 (TW) ................................. 112133261

(51) Int. Cl.
*H01Q 5/328* (2015.01)
*H01Q 5/364* (2015.01)
(Continued)

(52) U.S. Cl.
CPC ......... *H01Q 9/0442* (2013.01); *H01Q 9/0414* (2013.01); *H01Q 9/0457* (2013.01); *H01Q 21/30* (2013.01)

(58) Field of Classification Search
CPC ........ H01Q 5/328; H01Q 5/364; H01Q 5/378; H01Q 9/0414; H01Q 9/0442; H01Q 9/0457; H01Q 9/42; H01Q 21/30
See application file for complete search history.

(56) References Cited

U.S. PATENT DOCUMENTS 7,324,050 B2 * 1/2008 Chung .................. H01Q 1/243 343/700 MS
9,973,228 B2 * 5/2018 Heikura ................ H01Q 5/378
(Continued)

FOREIGN PATENT DOCUMENTS

TW 200703779 A 1/2007
TW 202143554 A 11/2021

OTHER PUBLICATIONS

Kiran et al., "Penta-band Planar Inverted F Antenna for Wireless Communication Applications", 2022 IEEE Microwaves, Antennas, and Propagation Conference (MAPCON), Dec. 12-16, 2022 (Year: 2022).*

*Primary Examiner* — Alexander H Taningco
*Assistant Examiner* — Marin Stoytchev Stoytchev
(74) *Attorney, Agent, or Firm* — McClure, Qualey & Rodack, LLP

(57) ABSTRACT

A hybrid antenna structure includes a ground element, a feeding radiation element, a first radiation element, a second radiation element, a first connection radiation element, a second connection radiation element, a shorting radiation element, a third radiation element, and an integrated module. The ground element provides a ground voltage. The feeding radiation element has a feeding point. The second radiation element is coupled to the feeding radiation element. The first radiation element is coupled through the first connection radiation element and the second connection radiation element to the second radiation element. The second radiation element is also coupled through the shorting radiation element to the ground voltage. The third radiation element is adjacent to the second radiation element. The integrated module is coupled to the third radiation element. The integrated module has the functions of circuit adjustment and proximity sense.

21 Claims, 4 Drawing Sheets

(51) Int. Cl.

| | |
|---|---|
| ***H01Q 5/378*** | (2015.01) |
| ***H01Q 9/04*** | (2006.01) |
| ***H01Q 9/42*** | (2006.01) |
| ***H01Q 21/30*** | (2006.01) |

(56) References Cited

U.S. PATENT DOCUMENTS 12,027,782 B2 7/2024 Lin
12,394,915 B2 * 8/2025 Kuo ....................... H01Q 21/30

* cited by examiner

HYBRID ANTENNA STRUCTURE

CROSS REFERENCE TO RELATED APPLICATIONS

This application claims priority of Taiwan Patent Application No. 112133261 filed on Sep. 1, 2023, the entirety of which is incorporated by reference herein.

BACKGROUND OF THE INVENTION

Field of the Invention

The disclosure generally relates to a hybrid antenna structure, and more particularly, to a wideband hybrid antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna element.

BRIEF SUMMARY OF THE INVENTION

In an exemplary embodiment, the invention is directed to a hybrid antenna structure that includes a ground element, a feeding radiation element, a first radiation element, a second radiation element, a first connection radiation element, a second connection radiation element, a shorting radiation element, a third radiation element, and an integrated module. The ground element provides a ground potential. The feeding radiation element has a feeding point. The second radiation element is coupled to the feeding radiation element. The first radiation element is coupled through the first connection radiation element and the second connection radiation element to the second radiation element. The second radiation element is also coupled through the shorting radiation element to the ground potential. The third radiation element is adjacent to the second radiation element. The integrated module is coupled to the third radiation element. The integrated module has the functions of circuit adjustment and proximity sense.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
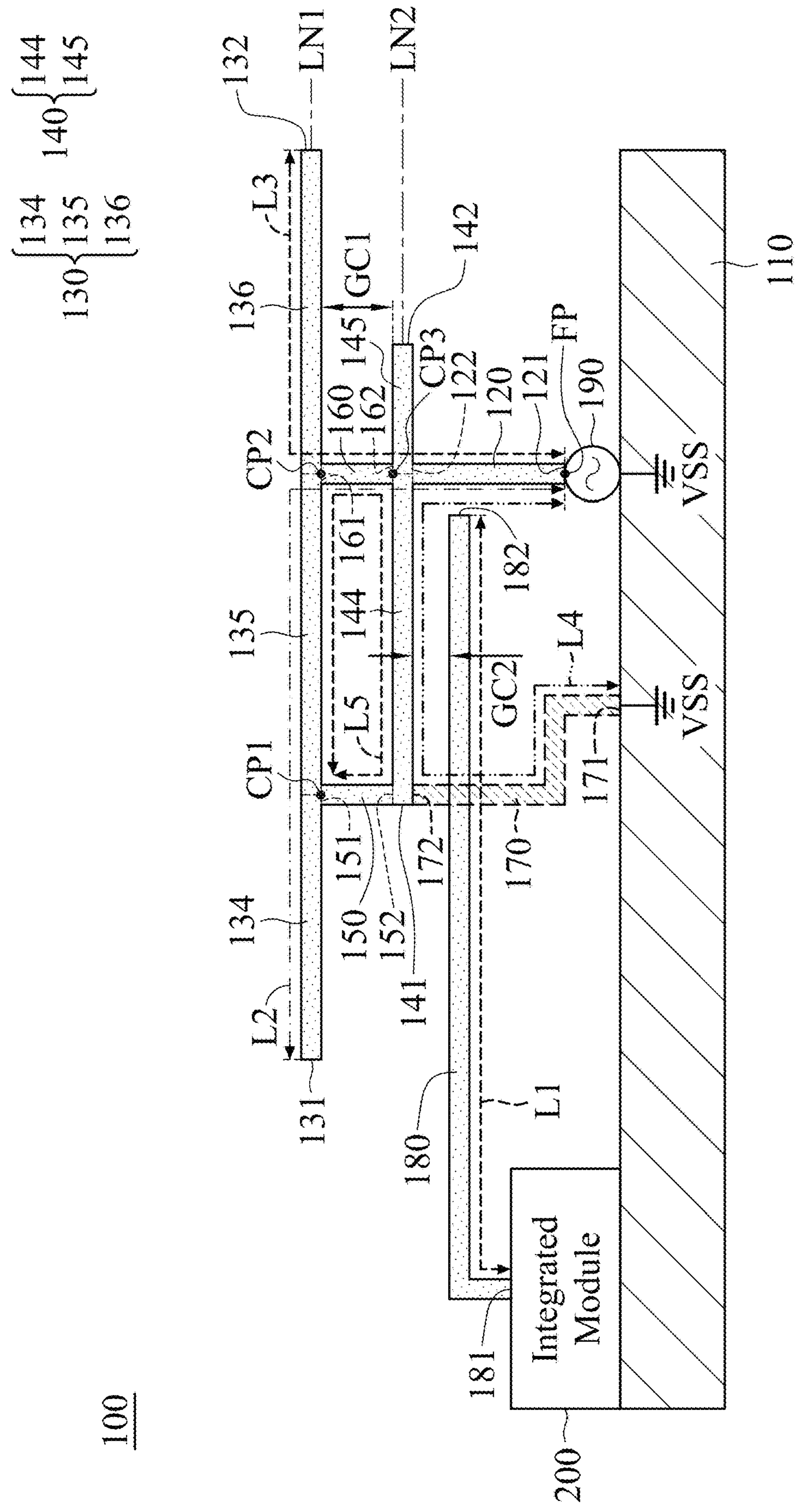
FIG. 1 is a diagram of a hybrid antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a hybrid antenna structure 100 according to an embodiment of the invention. The hybrid antenna structure 100 may be applied to a mobile device, such as a smart phone, a tablet computer, or a notebook computer. As shown in FIG. 1, the hybrid antenna structure 100 includes a ground element 110, a feeding radiation element 120, a first radiation element 130, a second radiation element 140, a first connection radiation element 150, a second connection radiation element 160, a shorting radiation element 170, a third radiation element 180, and an integrated module 200. The ground element 110, the feeding radiation element 120, the first radiation element 130, the second radiation element 140, the first connection radiation element 150, the second connection radiation element 160, the shorting radiation element 170, and the third radiation element 180 may all be made of metal materials, such as copper, silver, aluminum, iron, or their alloys.

The ground element 110 is configured to provide a ground potential VSS. For example, the ground element 110 may substantially have a rectangular shape, but it is not limited thereto. In some embodiments, the ground element 110 is implemented with a ground copper foil, which may be further coupled to a system ground plane (not shown) of the hybrid antenna structure 100.

The feeding radiation element 120 has a first end 121 and a second end 122. A feeding point FP is positioned at the first end 121 of the feeding radiation element 120. The feeding point FP may be further coupled to a signal source 190. For example, the signal source 190 may be an RF (Radio Frequency) module for exciting the hybrid antenna structure 100. In some embodiments, the feeding radiation element 120 substantially has a straight-line shape, but it is not limited thereto.

The first radiation element 130 has a first end 131 and a second end 132, each of which may be an open end. Specifically, the first radiation element 130 includes a first segment 134, a second segment 135, and a third segment 136. For example, the first segment 134, the second segment 135, and the third segment 136 may all be substantially arranged in a first straight line LN1. The first segment 134 is adjacent to the first end 131 of the first radiation element 130. The third segment 136 is adjacent to the second end 132 of the first radiation element 130. The second segment 135 is coupled between the first segment 134 and the third segment 136. In addition, a first connection point CP1 is positioned between the first segment 134 and the second segment 135, and a second connection point CP2 is positioned between the second segment 135 and the third segment 136. In some embodiments, the first radiation element 130 substantially has a relatively long straight-line shape, but it is not limited thereto. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

The second radiation element 140 has a first end 141 and a second end 142. The second end 142 of the second radiation element 140 may be an open end. Specifically, the second radiation element 140 includes a fourth segment 144 and a fifth segment 145. For example, the fourth segment 144 and the fifth segment 145 may both be substantially arranged in a second straight line LN2. The fourth segment 144 is adjacent to the first end 141 of the second radiation element 140. The fifth segment 145 is adjacent to the second end 142 of the second radiation element 140. It should be noted that the second straight line LN2 may be substantially parallel to the aforementioned first straight line LN1. In addition, a third connection point CP3 is positioned between the fourth segment 144 and the fifth segment 145. The third connection point CP3 of the second radiation element 140 is also coupled to the second end 122 of the feeding radiation element 120. In some embodiments, the fifth segment 145 is adjacent to the third segment 136, such that a first coupling gap GC1 is formed between the third segment 136 and the fifth segment 145. In some embodiments, the second radiation element 140 substantially has a relatively median straight-line shape, but it is not limited thereto.

The first connection radiation element 150 has a first end 151 and a second end 152. The first end 151 of the first connection radiation element 150 is coupled to the first connection point CP1 of the first radiation element 130. The second end 152 of the first connection radiation element 150 is coupled to the first end 141 of the second radiation element 140. In some embodiments, the first connection radiation element 150 substantially has a relatively short straight-line shape, but it is not limited thereto.

The second connection radiation element 160 has a first end 161 and a second end 162. The first end 161 of the second connection radiation element 160 is coupled to the second connection point CP2 of the first radiation element 130. The second end 162 of the second connection radiation element 160 is coupled to the third connection point CP3 of the second radiation element 140. In some embodiments, the second connection radiation element 160 substantially has another relatively short straight-line shape, which may be substantially parallel to the first connection radiation element 150, but it is not limited thereto. Thus, the first radiation element 130 is coupled through the first connection radiation element 150 and the second connection radiation element 160 to the second radiation element 140. It should be noted that a closed loop is formed by the first connection radiation element 150, the second segment 135, the second connection radiation element 160, and the fourth segment 144. For example, the aforementioned closed loop may substantially have a hollow rectangular shape, but it is not limited thereto.

The shorting radiation element 170 has a first end 171 and a second end 172. The first end 171 of the shorting radiation element 170 is coupled to the ground potential VSS. The second end 172 of the shorting radiation element 170 is coupled to the first end 141 of the second radiation element 140 and the second end 152 of the first connection radiation element 150. Thus, both the second radiation element 140 and the first connection radiation element 150 are coupled through the shorting radiation element 170 to the ground potential VSS. In some embodiments, the shorting radiation element 170 substantially has an N-shape, but it is not limited thereto. It should be noted that the shorting radiation element 170 may be positioned on another surface, such that the shorting radiation element 170 cannot directly touch the third radiation element 180. For example, the shorting radiation element 170 may be disposed on a back surface of a carrier element (not shown), and the third radiation element 180 may be disposed on a front surface of the carrier element, but they are not limited thereto.

The third radiation element 180 has a first end 181 and a second end 182. The first end 181 of the third radiation element 180 is coupled to the integrated module 200. The second end 182 of the third radiation element 180 may be an open end. For example, the second end 132 of the first radiation element 130, the second end 142 of the second radiation element 140, and the second end 182 of the third radiation element 180 may substantially extend in the same direction. In some embodiments, the third radiation element 180 is adjacent to the second radiation element 140, such that a second coupling gap GC2 is formed between the fourth segment 144 and the third radiation element 180. In some embodiments, the third radiation element 180 substantially has an L-shape, which may be at least partially parallel to the second radiation element 140, but it is not limited thereto.

The internal circuit structure of the integrated module 200 is not limited in the invention. Generally, the integrated module 200 has both functions: it can make circuit adjustments and serve as a proximity sensor. The third radiation element 180 may also be coupled through the integrated module 200 to the ground element 110, but it is not limited thereto.

In some embodiments, the hybrid antenna structure 100 can cover a first frequency band, a second frequency band, a third frequency band, a fourth frequency band, and a fifth frequency band. For example, the first frequency band may be from 617 MHz to 960 MHz, the second frequency band may be from 1400 MHz to 2000 MHz, the third frequency band may be from 2000 MHz to 2690 MHz, the fourth frequency band may be from 3300 MHz to 5000 MHz, and the fifth frequency band may be from 5000 MHz to 5925 MHz. Accordingly, the hybrid antenna structure 100 can support at least the wideband operations of the next-generation 5G (5th Generation Mobile Networks) communication.

In some embodiments, the operational principles of the hybrid antenna structure 100 are described below. The third radiation element 180 can be excited by the feeding radiation element 120 and the second radiation element 140 using a coupling mechanism, so as to generate the aforementioned first frequency band. The feeding radiation element 120, the first segment 134, the second segment 135, and the second connection radiation element 160 can be excited to generate the aforementioned second frequency band. The feeding radiation element 120, the third segment 136, and the second connection radiation element 160 can be excited to generate the aforementioned third frequency band. The feeding radiation element 120, the fourth segment 144, and the shorting radiation element 170 can be excited to generate the aforementioned fourth frequency band. The second segment 135, the fourth segment 144, the first connection radiation element 150, and the second connection radiation element 160 (i.e., the aforementioned closed loop) can be excited to generate the aforementioned fifth frequency band. The fifth segment 145 is configured to fine-tune the impedance matching of the hybrid antenna structure 100, thereby increasing the operational bandwidth of the hybrid antenna structure 100. Also, the third radiation element 180 is configured as a sensing element of the integrated module 200, meaning that the hybrid antenna structure 100 is able to perform the function of a proximity sensor.

In some embodiments, the element sizes of the hybrid antenna structure 100 are described below. The length L1 of the third radiation element 180 may be substantially equal to 0.25 wavelength (λ/4) of the first frequency band of the hybrid antenna structure 100. The total length L2 of the first segment 134, the second segment 135, the second connection radiation element 160, and the feeding radiation element 120 may be substantially equal to 0.25 wavelength (λ/4) of the second frequency band of the hybrid antenna structure 100. The total length L3 of the third segment 136, the second connection radiation element 160, and the feeding radiation element 120 may be substantially equal to 0.25 wavelength (λ/4) of the third frequency band of the hybrid antenna structure 100. The total length L4 of the shorting radiation element 170, the fourth segment 144, and the feeding radiation element 120 may be substantially equal to 0.5 wavelength (λ/2) of the fourth frequency band of the hybrid antenna structure 100. The total length L5 of the first connection radiation element 150, the second segment 135, the second connection radiation element 160, and the fourth segment 144 (i.e., the aforementioned closed loop) may be substantially equal to 0.5 wavelength (λ/2) of the fifth frequency band of the hybrid antenna structure 100. The width of the first coupling gap GC1 may be smaller than or equal to 2 mm. The width of the second coupling gap GC2 may be smaller than or equal to 2 mm. The above ranges of element sizes are calculated and obtained according to many experiment results, and they help to optimize the operational bandwidth and impedance matching of the hybrid antenna structure 100, and to reduce the interference between the integrated module 200 and other radiation elements.

The following embodiments will introduce different configurations and detailed structural features of the hybrid antenna structure 100. It should be understood that these figures and descriptions are merely exemplary, rather than limitations of the invention.

Figure 2:
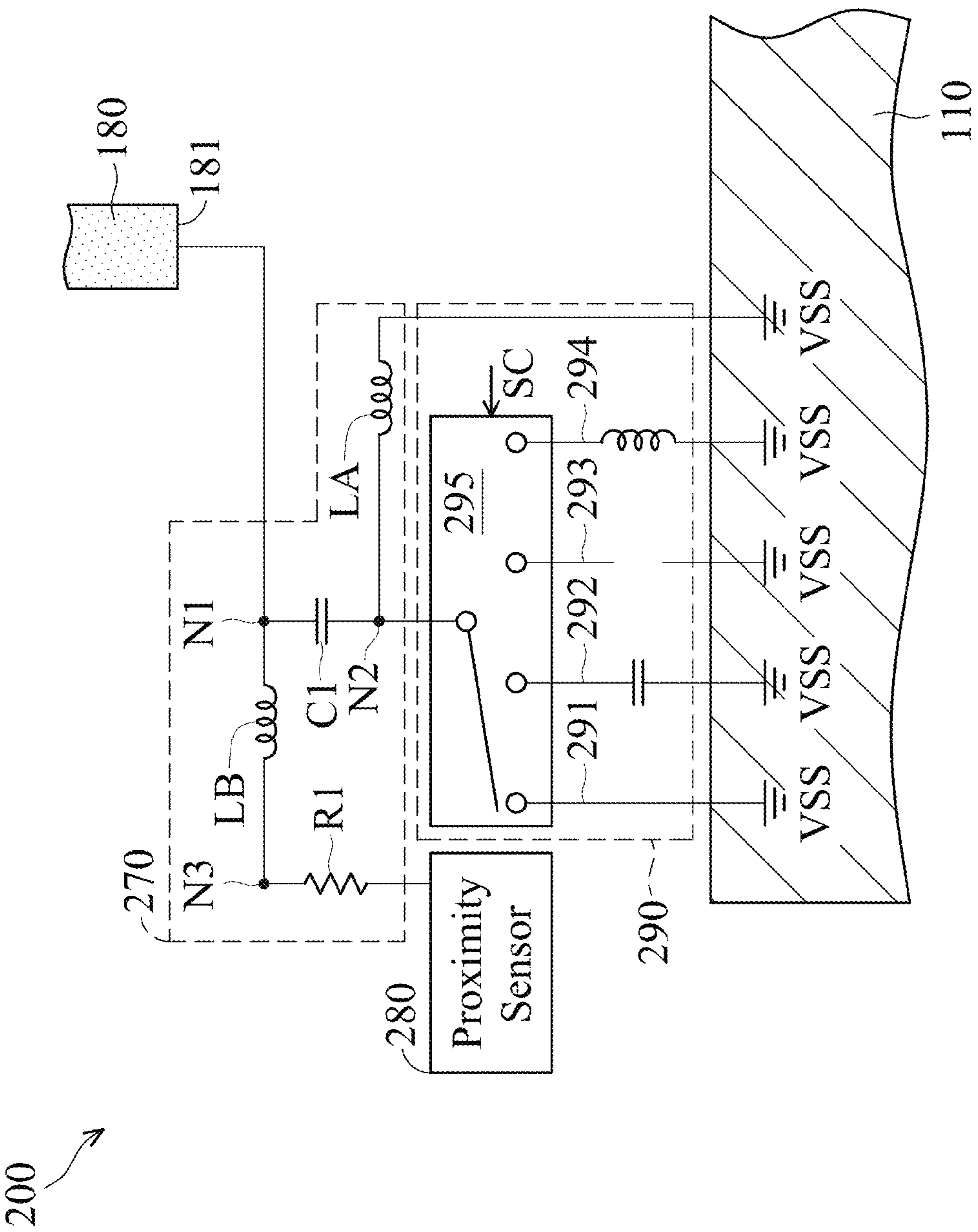
FIG. 2 is a diagram of an integrated module according to an embodiment of the invention.

FIG. 2 is a diagram of an integrated module 200 according to an embodiment of the invention. In the embodiment of FIG. 2, the integrated module 200 includes a filter circuit 270, a proximity sensor 280 (also called as a "P-sensor"), and a tuning circuit 290. The internal structures of the filter circuit 270 and the tuning circuit 290 are not limited in the invention, and they are adjustable according to different requirements. For example, each of the filter circuit 270 and the tuning circuit 290 may include one or more inductors, one or more capacitors, and one or more resistors. The third radiation element 180 is also coupled through the filter circuit 270 to the proximity sensor 280. The filter circuit 270 is also coupled through the tuning circuit 290 to the ground potential VSS. Generally, the third radiation element 180 can be used as a relative sensing pad of the proximity sensor 280, and the filter circuit 270 can be used to prevent the proximity sensor 280 from negatively affecting the radiation performance of the hybrid antenna structure 100. Also, the incorporation of the tuning circuit 290 can help to increase the operational bandwidth of the hybrid antenna structure 100.

Specifically, the filter circuit 270 includes a first inductor LA, a second inductor LB, a capacitor C1, and a resistor R1. The tuning circuit 290 includes a short-circuited path 291, a capacitive path 292, an open-circuited path 293, an inductive path 294, and a switch element 295.

The capacitor C1 has a first terminal coupled to a first node N1, and a second terminal coupled to a second node N2. The first node N1 may be further coupled to the first end 181 of the third radiation element 180. The first inductor LA has a first terminal coupled to the second node N2, and a second terminal coupled to the ground potential VSS. The second inductor LB has a first terminal coupled to a third node N3, and a second terminal coupled to the first node N1. The resistor R1 has a first terminal coupled to the third node N3, and a second terminal coupled to the proximity sensor 280.

In the filter circuit 270, the capacitor C1 can be used as a high-pass filter element, so as to prevent low-frequency noise of the proximity sensor 280 from entering the tuning circuit 290. According to practical measurements, the incorporation of the first inductor LA can reduce the probability of the proximity sensor 280 taking error actions when the tuning circuit 290 is being switched. The second inductor LB can be used as a low-pass filter element, so as to prevent the proximity sensor 280 from negatively affecting the radiation performance of the hybrid antenna structure 100. In addition, the resistor R1 can reduce interference between the proximity sensor 280 and other radiation elements.

The short-circuited path 291, the capacitive path 292, the open-circuited path 293, and the inductive path 294 are respectively coupled to the ground potential VSS of the ground element 110. A terminal of the switch element 295 is coupled to the second node N2. Another terminal of the switch element 295 is switchable between the short-circuited path 291, the capacitive path 292, the open-circuited path 293, and the inductive path 294 according to a control signal SC. Thus, the second node N2 can be coupled through the path selected by the switch element 295 to the ground potential VSS. For example, the control signal SC may be generated by a processor (not shown) according to a user input, but it is not limited thereto.

When the switch element 295 is being switched between the short-circuited path 291, the capacitive path 292, the open-circuited path 293, and the inductive path 294, the grounding impedance value of the hybrid antenna structure 100 can be correspondingly adjusted. According to practical measurements, this design can help to significantly increase the operational bandwidth of the hybrid antenna structure 100, especially for the first frequency band and the second frequency band, as mentioned above.

In some embodiments, the element parameters of the hybrid antenna structure 100 are described below. The inductance of the first inductor LA may be greater than or equal to 56 nH. The inductance of the second inductor LB may be greater than or equal to 56 nH. The capacitance of the capacitor C1 may be from 10 pF to 180 pF. The resistance of the resistor R1 may be from 0Ω to 10KΩ. The capacitance of the capacitive path 292 may be from 1 pF to 47 pF. The inductance of the inductive path 294 may be from 10 nH to 56 nH. The above ranges of element parameters are calculated and obtained according to many experiment results, and they help to minimize the impact of the proximity sensor 280 and to optimize the radiation performance of the hybrid antenna structure 100.

Figure 3:
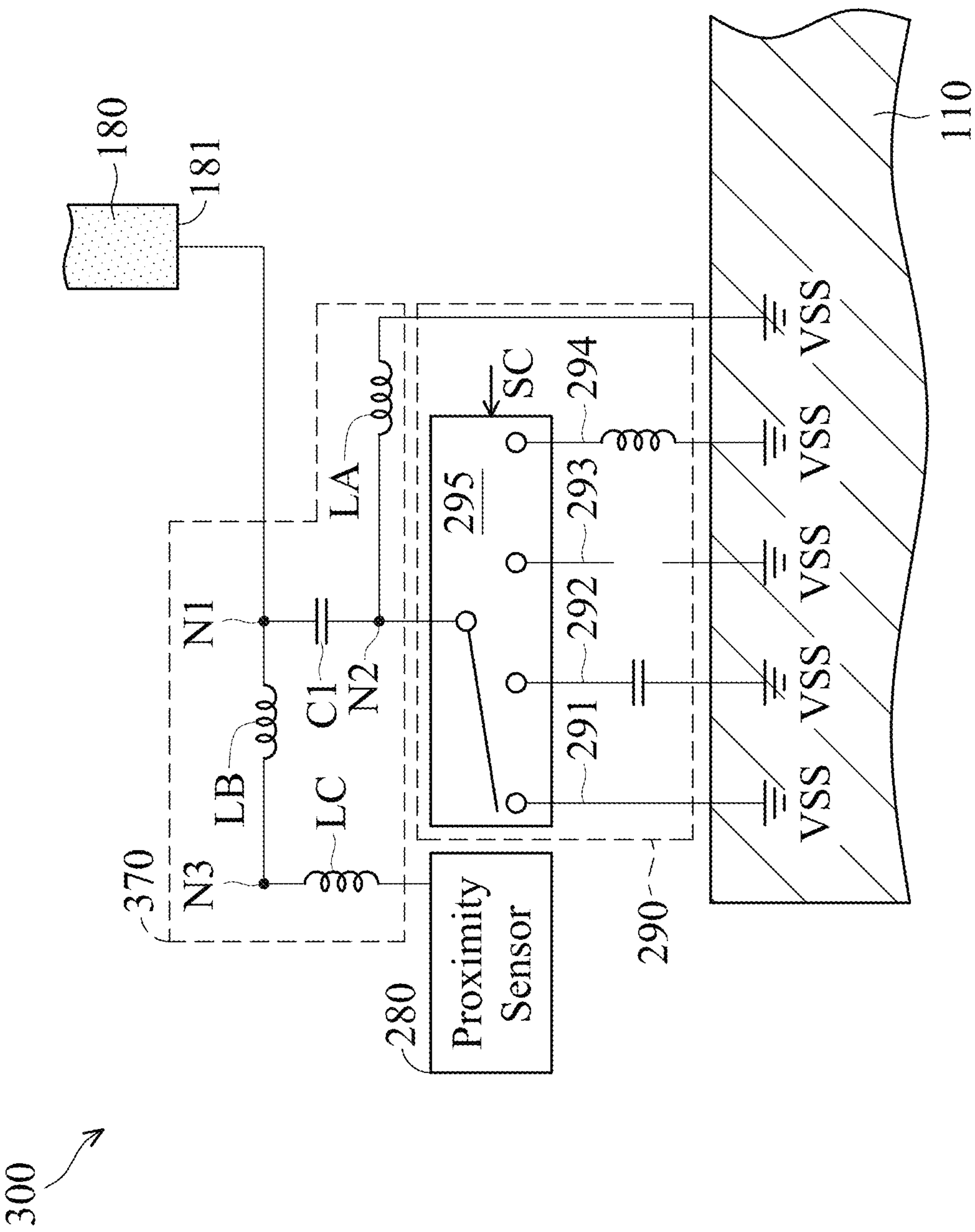
FIG. 3 is a diagram of an integrated module according to another embodiment of the invention.

FIG. 3 is a diagram of an integrated module 300 according to another embodiment of the invention. FIG. 3 is similar to FIG. 2. In the embodiment of FIG. 3, a filter circuit 370 of the integrated module 300 does not include the resistor R1 as mentioned above, but further includes a third inductor LC. Specifically, the third inductor LC has a first terminal coupled to the third node N3, and a second terminal coupled to the proximity sensor 280. For example, the inductance of the third inductor LC may be from 10 nH to 330 nH, but it is not limited thereto. According to practical measurements, the third inductor LC can also reduce the interference between the proximity sensor 280 and other radiation elements. Other features of the integrated module 300 of FIG. 3 are similar to those of the integrated module 200 of FIG. 2. Therefore, the two embodiments can achieve similar levels of performance.

Figure 4:
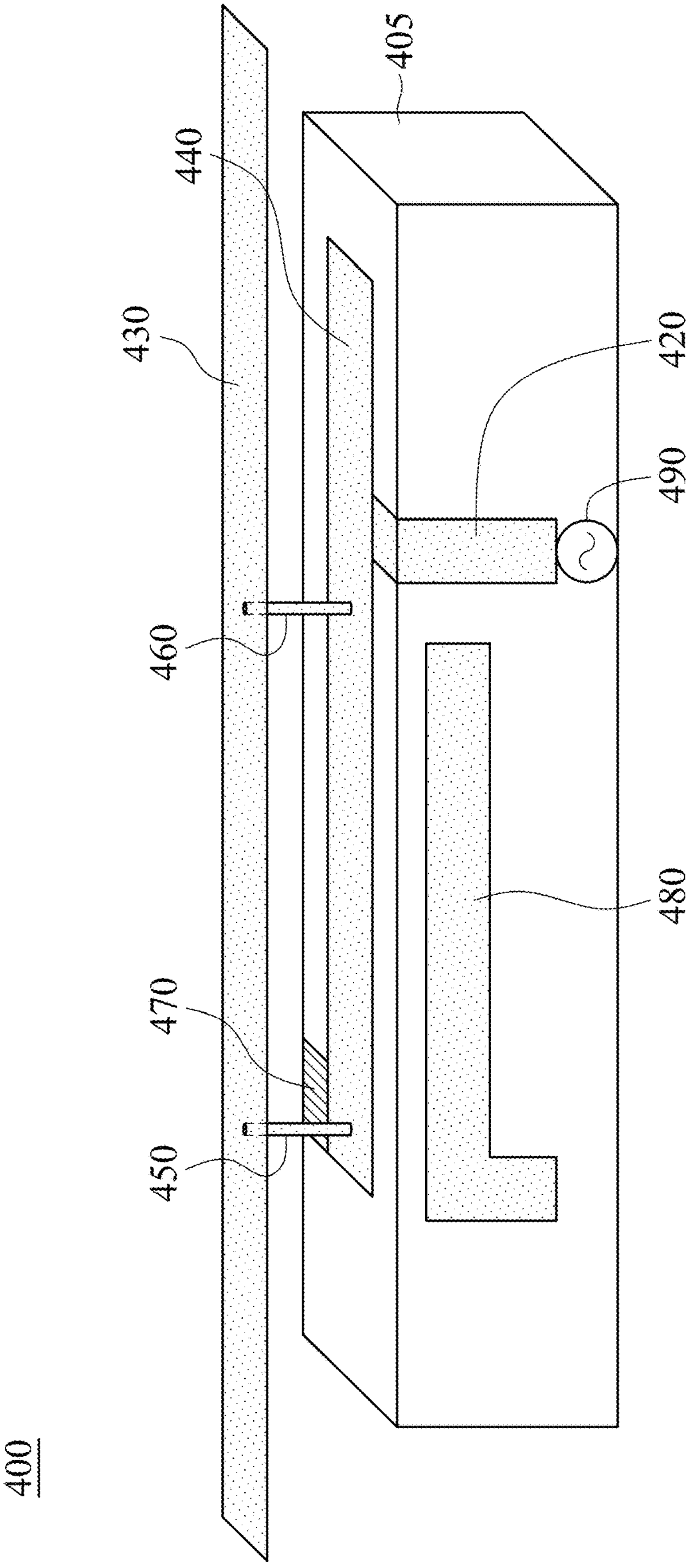
FIG. 4 is a perspective view of a hybrid antenna structure according to an embodiment of the invention.

FIG. 4 is a perspective view of a hybrid antenna structure 400 according to an embodiment of the invention. FIG. 4 is similar to FIG. 1. In the embodiment of FIG. 4, the hybrid antenna structure 400 includes a ground element (not shown), a nonconductive support element 405, a feeding radiation element 420, a first radiation element 430, a second radiation element 440, a first connection radiation element 450, a second connection radiation element 460, a shorting radiation element 470, a third radiation element 480, a signal source 490, and an integrated module (not shown). The feeding radiation element 420, the second radiation element 440, the shorting radiation element 470, and the third radiation element 480 may be distributed over the nonconductive support element 405. In some embodiments, the shorting radiation element 470 and the third radiation element 480 are disposed on different surfaces of the nonconductive support element 405.

For example, the nonconductive support element 405 may be implemented with a holder or a PCB (Printed Circuit Board), and the first radiation element 430 may be implemented with an iron part or a stamping element. The second radiation element 440 may be printed on a surface of the nonconductive support element 405. Thus, the first radiation element 430 and the second radiation element 440 may be substantially positioned on two different planes which are parallel to each other. In addition, each of the first connection radiation element 450 and the second connection radiation element 460 may be implemented with a pogo pin or a metal spring. However, the invention is not limited thereto. In alternative embodiments, an integral molding design (e.g., a π-shaped iron part) is formed by the first radiation element 430, the first connection radiation element 450, and the second connection radiation element 460. In some embodiments, the feeding radiation element 420, the second radiation element 440, the shorting radiation element 470, and the third radiation element 480 can be formed on the nonconductive support element 405 by using the LDS (Laser Direct Structuring) technology. Other features of the hybrid antenna structure 400 of FIG. 4 are similar to those of the hybrid antenna structure 100 of FIG. 1. Therefore, the two embodiments can achieve similar levels of performance.

The invention proposes a novel hybrid antenna structure. In comparison to the conventional design, the invention has the advantages of small size, wide bandwidth, the ability to sense proximity, high communication quality, and low manufacturing cost. Therefore, the invention is suitable for application in a variety of mobile communication devices, in particular to the devices with narrow borders.

Note that the above element sizes, element shapes, element parameters, and frequency ranges are not limitations of the invention. An antenna designer can fine-tune these settings or values in order to meet specific requirements. It should be understood that the hybrid antenna structure of the invention is not limited to the configurations depicted in FIGS. 1-4. The invention may merely include any one or more features of any one or more embodiments of FIGS. 1-4. In other words, not all of the features displayed in the figures should be implemented in the hybrid antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hybrid antenna structure, comprising:

a ground element;

a feeding radiation element, having a feeding point;

a first radiation element;

a first connection radiation element;
a second connection radiation element;
a second radiation element, coupled to the feeding radiation element, wherein the first radiation element is coupled through the first connection radiation element and the second connection radiation element to the second radiation element;
a shorting radiation element, wherein the second radiation element is coupled through the shorting radiation element to the ground element;
a third radiation element, disposed adjacent to the second radiation element; and
an integrated module, coupled to the third radiation element, wherein the integrated module has functions of circuit adjustment and proximity sense;
wherein the second radiation element is positioned between the ground element and the first radiation element.

2. The hybrid antenna structure as claimed in claim 1, wherein the first radiation element comprises a first segment, a second segment, and a third segment arranged in a first straight line.

3. The hybrid antenna structure as claimed in claim 2, wherein the second radiation element comprises a fourth segment and a fifth segment arranged in a second straight line, and the second straight line is parallel to the first straight line.

4. The hybrid antenna structure as claimed in claim 3, wherein a closed loop is formed by the first connection radiation element, the second segment, the second connection radiation element, and the fourth segment.

5. The hybrid antenna structure as claimed in claim 3, wherein a first coupling gap is formed between the third segment and the fifth segment, and a width of the first coupling gap is smaller than or equal to 2 mm.

6. The hybrid antenna structure as claimed in claim 3, wherein a second coupling gap is formed between the fourth segment and the third radiation element, and a width of the second coupling gap is smaller than or equal to 2 mm.

7. The hybrid antenna structure as claimed in claim 3, wherein the hybrid antenna structure covers a first frequency band, a second frequency band, a third frequency band, a fourth frequency band, and a fifth frequency band.

8. The hybrid antenna structure as claimed in claim 7, wherein the first frequency band is from 617 MHz to 960 MHz, the second frequency band is from 1400 MHz to 2000 MHz, the third frequency band is from 2000 MHz to 2690 MHz, the fourth frequency band is from 3300 MHz to 5000 MHz, and the fifth frequency band is from 5000 MHz to 5925 MHz.

9. The hybrid antenna structure as claimed in claim 7, wherein a length of the third radiation element is equal to 0.25 wavelength of the first frequency band.

10. The hybrid antenna structure as claimed in claim 7, wherein a total length of the first segment, the second segment, the second connection radiation element, and the feeding radiation element is equal to 0.25 wavelength of the second frequency band.

11. The hybrid antenna structure as claimed in claim 7, wherein a total length of the third segment, the second connection radiation element, and the feeding radiation element is equal to 0.25 wavelength of the third frequency band.

12. The hybrid antenna structure as claimed in claim 7, wherein a total length of the shorting radiation element, the fourth segment, and the feeding radiation element is equal to 0.5 wavelength of the fourth frequency band.

13. The hybrid antenna structure as claimed in claim 7, wherein a total length of the first connection radiation element, the second segment, the second connection radiation element, and the fourth segment is equal to 0.5 wavelength of the fifth frequency band.

14. The hybrid antenna structure as claimed in claim 1, wherein the integrated module comprises:
a filter circuit;
a proximity sensor, wherein the third radiation element is coupled through the filter circuit to the proximity sensor; and
a tuning circuit, wherein the filter circuit is coupled through the tuning circuit to the ground element.

15. The hybrid antenna structure as claimed in claim 14, wherein the filter circuit comprises:
a capacitor, wherein the capacitor has a first terminal coupled to a first node, and a second terminal coupled to a second node;
wherein the first node is coupled to the third radiation element.

16. The hybrid antenna structure as claimed in claim 15, wherein the filter circuit further comprises:
a first inductor, wherein the first inductor has a first terminal coupled to the second node, and a second terminal coupled to the ground element.

17. The hybrid antenna structure as claimed in claim 16, wherein the filter circuit further comprises:
a second inductor, wherein the second inductor has a first terminal coupled to a third node, and a second terminal coupled to the first node.

18. The hybrid antenna structure as claimed in claim 17, wherein the filter circuit further comprises:
a resistor, wherein the resistor has a first terminal coupled to the third node, and a second terminal coupled to the proximity sensor.

19. The hybrid antenna structure as claimed in claim 17, wherein the filter circuit further comprises:
a third inductor, wherein the third inductor has a first terminal coupled to the third node, and a second terminal coupled to the proximity sensor.

20. The hybrid antenna structure as claimed in claim 15, wherein the tuning circuit comprises:
a short-circuited path, coupled to the ground element;
a capacitive path, coupled to the ground element;
an open-circuited path, coupled to the ground element;
an inductive path, coupled to the ground element; and
a switch element, wherein a terminal of the switch element is coupled to the second node, and another terminal of the switch element is switchable between the short-circuited path, the capacitive path, the open-circuited path, and the inductive path according to a control signal.

21. A hybrid antenna structure, comprising:
a ground element;
a feeding radiation element, having a feeding point;
a first radiation element;
a first connection radiation element;
a second connection radiation element;
a second radiation element, coupled to the feeding radiation element, wherein the first radiation element is coupled through the first connection radiation element and the second connection radiation element to the second radiation element;
a shorting radiation element, wherein the second radiation element is coupled through the shorting radiation element to the ground element;

a third radiation element, disposed adjacent to the second radiation element; and an integrated module, coupled to the third radiation element, wherein the integrated module has functions of circuit adjustment and proximity sense;

wherein the first radiation element comprises a first segment, a second segment and a third segment, and the second segment is positioned between the first segment and the third segment;

wherein the second radiation element comprises a fourth segment and a fifth segment;

wherein a closed loop is formed by the first connection radiation element, the second segment, the second connection radiation element, and the fourth segment.

* * * * *